US012073764B2

(12) United States Patent
Wang et al.

(10) Patent No.: US 12,073,764 B2
(45) Date of Patent: Aug. 27, 2024

(54) CIRCUIT DRIVING SUBSTRATE, DISPLAY PANEL, AND DISPLAY DRIVING METHOD

(71) Applicant: E Ink Holdings Inc., Hsinchu (TW)

(72) Inventors: Wenchuan Wang, Hsinchu (TW); Kuang-Heng Liang, Hsinchu (TW); Ian French, Hsinchu (TW); Chih-Ching Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/308,687

(22) Filed: Apr. 28, 2023

(65) Prior Publication Data

US 2023/0377505 A1 Nov. 23, 2023

(30) Foreign Application Priority Data

May 19, 2022 (TW) ................................. 111118680

(51) Int. Cl.
*G09G 3/20* (2006.01)

(52) U.S. Cl.
CPC ... *G09G 3/2092* (2013.01); *G09G 2310/0267* (2013.01)

(58) Field of Classification Search
CPC ......... G09G 3/2092; G09G 2310/0267; G09G 3/3659; G09G 3/3688; G09G 3/3674; G02F 1/1368; G02F 1/16766; H01L 29/78675
See application file for complete search history.

(56) References Cited

U.S. PATENT DOCUMENTS 8,786,538 B2 7/2014 Byun et al.
10,515,596 B2 12/2019 Chen
2005/0068279 A1* 3/2005 Hirota .................. G09G 3/3659 257/E27.111
2015/0243722 A1* 8/2015 Kwon ............... H01L 29/78675 257/40
2016/0163276 A1 6/2016 Hsu
2019/0080654 A1* 3/2019 Chen ................... G02F 1/16766
2019/0147818 A1* 5/2019 Wang ................... G09G 3/3674 345/204
2020/0020294 A1* 1/2020 Lu ........................ G09G 3/3688
2020/0409193 A1* 12/2020 Yamamoto ............ G02F 1/1368

FOREIGN PATENT DOCUMENTS

TW 200933569 8/2009
TW 201627836 8/2016
TW 202009909 3/2020

* cited by examiner

*Primary Examiner* — Richard J Hong
(74) *Attorney, Agent, or Firm* — JCIPRNET

(57) ABSTRACT

A circuit driving substrate, display panel and a display driving method are provided. The circuit driving substrate includes a pixel array, a first switching circuit, a second switching circuit, a first driving circuit and a second driving circuit. The first switching circuit is coupled to the pixel array through a plurality of gate lines, and receives a first switching signal. The second switching circuit is coupled to the pixel array through the gate lines, and receives a second switching signal. The first driving circuit is coupled to the first switching circuit and configured to output the first voltage signal to the first switching circuit. The second driving circuit is coupled to the second switching circuit and configured to output a second voltage signal to the second switching circuit. The first switching circuit and the second switching circuit selectively provide the first voltage signal or the second voltage signal.

10 Claims, 4 Drawing Sheets

CIRCUIT DRIVING SUBSTRATE, DISPLAY PANEL, AND DISPLAY DRIVING METHOD

CROSS-REFERENCE TO RELATED APPLICATION

This application claims the priority benefit of Taiwan application serial no. 111118680, filed on May 19, 2022. The entirety of the above-mentioned patent application is hereby incorporated by reference herein and made a part of this specification.

BACKGROUND

Technical Field

The disclosure relates to a device and a driving method thereof, and in particular, to a circuit driving substrate, a display panel, and a display driving method.

Description of Related Art

In the traditional display driving field, a driving circuit for driving a panel can only provide a simple driving signal waveform with a high voltage level and a low voltage level, thus limiting the function of display driving. However, if a driving voltage having multi-level voltage level changes is to be generated, the conventional approach is to redesign the driving chip. In other words, in the conventional display driving field, the panel driving waveform is easily limited, and there is a problem of high chip development cost and longer development time if a driving voltage having multi-level voltage level changes is to be generated.

SUMMARY

The disclosure provides a display panel, a circuit driving substrate, and a display driving method capable of providing good display driving effect.

A circuit driving substrate of the disclosure includes a pixel array, a first switching circuit, a second switching circuit, a first driving circuit, and a second driving circuit. The first switching circuit is coupled to the pixel array through a plurality of gate lines, and receives a first switching signal. The second switching circuit is coupled to the pixel array through the plurality of gate lines, and receives a second switching signal. The first driving circuit is coupled to the first switching circuit and configured to output a first voltage signal to the first switching circuit. The second driving circuit is coupled to the second switching circuit and configured to output a second voltage signal to the second switching circuit. The first switching circuit and the second switching circuit selectively provide the first voltage signal or the second voltage signal to the plurality of gate lines according to the first switching signal and the second switching signal.

A display driving method of the disclosure is for a circuit driving substrate. The circuit driving substrate includes a pixel array, a first switching circuit, a second switching circuit, a first driving circuit, and a second driving circuit. The first switching circuit and the second switching circuit are coupled to the pixel array through a plurality of gate lines. The first driving circuit is coupled to the first switching circuit. The second driving circuit is coupled to the second switching circuit. The display driving method includes: outputting a first voltage signal to the first switching circuit through the first driving circuit; outputting a second voltage signal to the second switching circuit through the second driving circuit; receiving a first switching signal through the first switching circuit; receiving a second switching signal through the second switching circuit; selectively providing the first voltage signal or the second voltage signal to the plurality of gate lines through the first switching circuit and the second switching circuit according to the first switching signal and the second switching signal.

A display panel of the disclosure includes a pixel array, a first switching circuit, a second switching circuit, a first driving circuit, a second driving circuit, and a display layer. The first switching circuit is coupled to the pixel array through a plurality of gate lines, and receives a first switching signal. The second switching circuit is coupled to the pixel array through the plurality of gate lines, and receives a second switching signal. The first driving circuit is coupled to the first switching circuit and configured to output a first voltage signal to the first switching circuit. The second driving circuit is coupled to the second switching circuit and configured to output a second voltage signal to the second switching circuit. A display layer is located on the pixel array. The first switching circuit and the second switching circuit selectively provide the first voltage signal or the second voltage signal to the plurality of gate lines according to the first switching signal and the second switching signal.

Based on the above, the circuit driving substrate, the display panel, and the display driving method of the disclosure can provide voltage signals with different voltage levels to a plurality of gate lines through two driving circuits in time division so as to generate gate line signals with multiple voltage level changes.

In order to make the above-mentioned features and advantages of the disclosure more obvious and easy to understand, the following embodiments are given and described in detail with the accompanying drawings as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
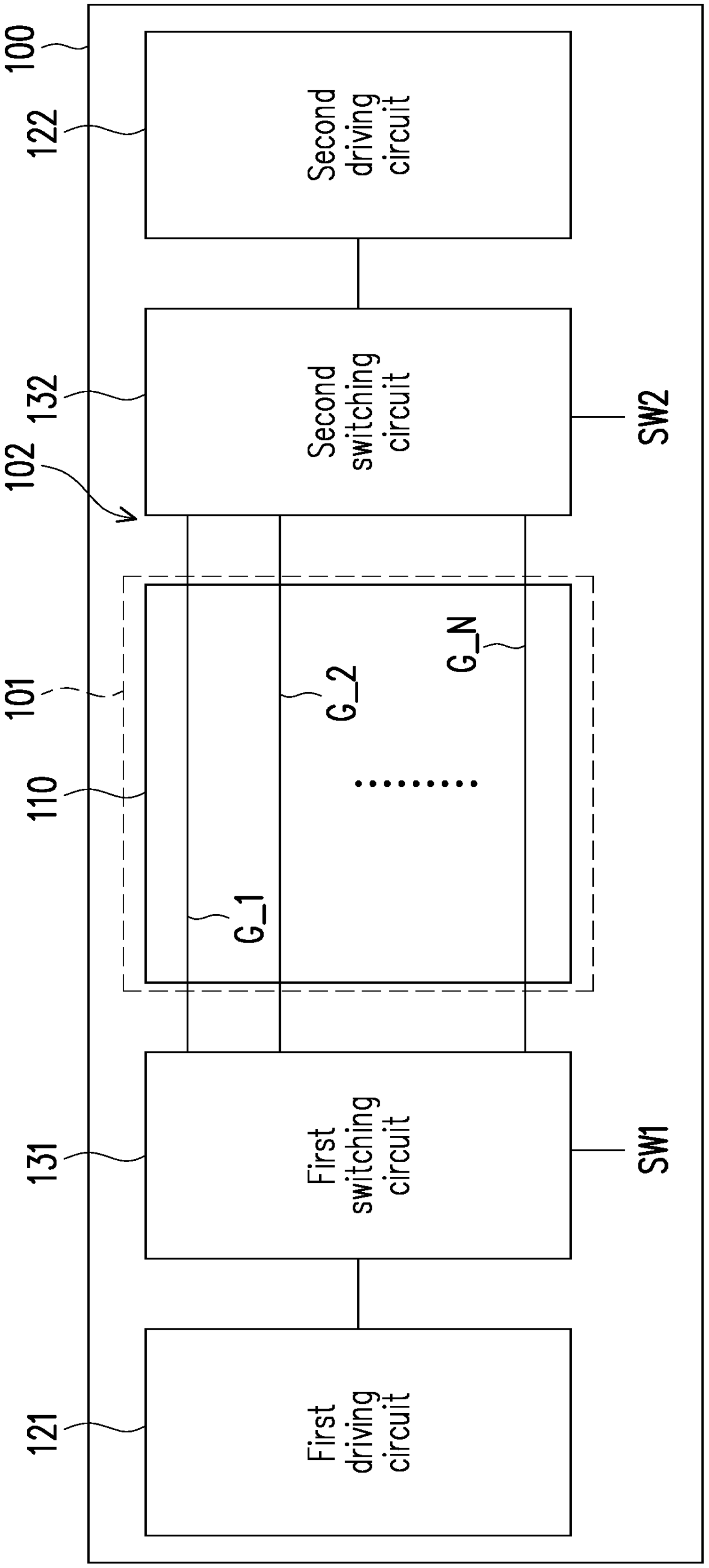
FIG. 1 is a schematic circuit diagram of a circuit driving substrate according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a schematic circuit diagram of a circuit driving substrate according to an embodiment of the disclosure. Referring to FIG. 1, a circuit driving substrate 100 has an active area (AA) 101 and a peripheral area 102. The peripheral area 102 is a panel area other than the active area 101. The peripheral area 102 surrounds the active area 101. The circuit driving substrate 100 includes a pixel array 110, a first driving circuit 121, a second driving circuit 122, a first switching circuit 131, and a second switching circuit 132. The pixel array 110 is disposed in the active area 101. The first driving circuit 121, the second driving circuit 122, the first switching circuit 131, and the second switching circuit 132 are disposed in the peripheral area 102. In this embodiment, the first switching circuit 131 is coupled to the pixel array 110 through a plurality of gate lines G_1-G_N, where N is a positive integer. The second switching circuit 132 is coupled to the pixel array 110 through the gate lines G_1-G_N. The first driving circuit 121 is coupled to the first switching circuit 131. The second driving circuit 122 is coupled to the second switching circuit 132.

In this embodiment, the circuit driving substrate 100 may be an electronic paper circuit driving substrate, and the plurality of pixel units disposed on the pixel array 110 may be a plurality of microcapsule units or microcup units. However, the type of the circuit driving substrate 100 of the disclosure is not limited thereto. In some embodiments of the disclosure, the circuit driving substrate 100 may also be a liquid crystal circuit driving substrate, a light emitting diode circuit driving substrate, an organic light emitting diode circuit driving substrate, or the like.

In another embodiment of the disclosure, the display panel has a display layer located on the pixel array 110. The pixel array 110 has an electrode layer of a thin-film transistor (TFT). The display layer may be an electronic paper ink layer (capsule layer or microcup layer), cholesteric liquid crystal or other display material layers.

In this embodiment, the first driving circuit 121 and the second driving circuit 122 may be gate drivers, respectively. In this embodiment, the pixel array 110 may include a plurality of pixel units, and the gate lines G_1-G_N may be respectively coupled to each row of the pixel units. Moreover, each column of the pixel units may also be coupled to a plurality of source lines, and the source lines may be coupled to the source driver.

In this embodiment, the first driving circuit 121 and the first switching circuit 131 may be disposed on a first side (the left side as shown in FIG. 1) of the peripheral area 102 of the circuit driving substrate 100. The second driving circuit 122 and the second switching circuit 132 may be disposed on a second side (the right side as shown in FIG. 1) of the peripheral area 102 of the circuit driving substrate 100, wherein the first side is opposite to the second side. The first switching circuit 131 may be coupled to one ends of the gate lines G_1-G_N, respectively, and the second switching circuit 132 may be coupled to the other ends of the gate lines G_1-G_N, respectively. However, in one embodiment, the first driving circuit 121 and the first switching circuit 131 may also be disposed on the first side (which may be the left side or the right right) of the peripheral area 102 of the circuit driving substrate 100. The second driving circuit 122 and the second switching circuit 132 may be disposed on a third side (which may be the upper side or the lower side) of the peripheral area 102 of the circuit driving substrate 100, wherein the first side is adjacent to the third side. Even, in another embodiment, the first driving circuit 121, the second driving circuit 122, the first switching circuit 131, and the second switching circuit 132 may also be disposed on the same side (which may be the left side, the right side, the top side, or the bottom side) of the peripheral area 102 of the circuit driving substrate 100.

In this embodiment, the first switching circuit 131 may receive a first switching signal SW1. The second switching circuit 132 may receive a second switching signal SW2. The first driving circuit 121 may output a first voltage signal to the first switching circuit 131. The second driving circuit 122 may output a second voltage signal to the second switching circuit 132. In this embodiment, the first switching circuit 131 and the second switching circuit 132 may selectively provide the first voltage signal or the second voltage signal to the gate lines G_1-G_N according to the first switching signal SW1 and the second switching signal SW2. In this embodiment, the first voltage signal may have a signal waveform change of a first high voltage level and a first low voltage level, and the second voltage signal may a have signal waveform change of a second high voltage level and a second low voltage level. It should be noted that the first high voltage level is different from the second high voltage level, and/or the first low voltage level is different from the second low voltage level. In this way, since the plurality of gate line signals respectively transmitted by the gate lines G_1-G_N are determined according to the first voltage signal and the second voltage signal, the plurality of gate line signals respectively transmitted by the gate lines G_1-G_N may have at least three different voltage level changes. The gate line signals transmitted by the gate lines G_1-G_N may be configured to drive the plurality of pixel units in the pixel array 110. The plurality of pixel units in the pixel array 110 can achieve multiple display driving effects according to different voltage level changes received through the gate lines G_1-G_N.

Figure 2:
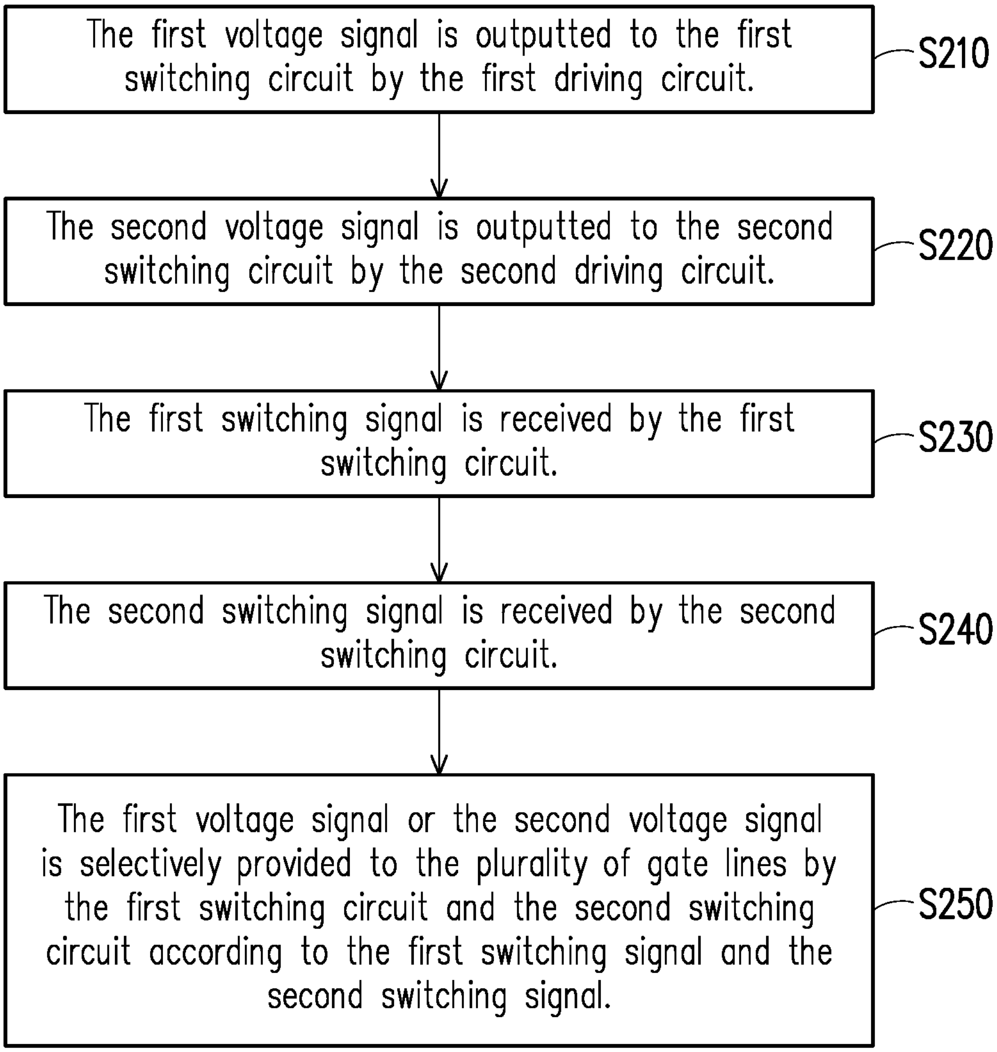
FIG. 2 is a flowchart of a display driving method according to an embodiment of the disclosure.

FIG. 2 is a flowchart of a display driving method according to an embodiment of the disclosure. Referring to FIG. 1 and FIG. 2, the circuit driving substrate 100 of the present embodiment may perform following steps S210-250 to perform effective display driving. In step S210, the first driving circuit 121 outputs the first voltage signal to the first switching circuit 131. In step S220, the second driving circuit 122 outputs the second voltage signal to the second switching circuit 132. In step S230, the first switching circuit 131 receives the first switching signal SW1. In step S240, the second switching circuit 132 receives the second switching signal SW2. In step S250, the first switching circuit 131 and the second switching circuit 132 selectively provide the first voltage signal or the second voltage signal to the plurality of gate lines according to the first switching signal SW1 and the second switching signal SW2. Therefore, the plurality of pixel units in the pixel array 110 may receive the gate line signals with at least three different voltage level changes through the gate lines G_1-G_N, so as to achieve multiple display driving effects. Moreover, for the relevant features of the circuit of this embodiment, reference may be made to the description of the above-mentioned embodiment in FIG. 1 and the following description of the embodiment in FIG. 3, and details are not repeated here.

Figure 3:
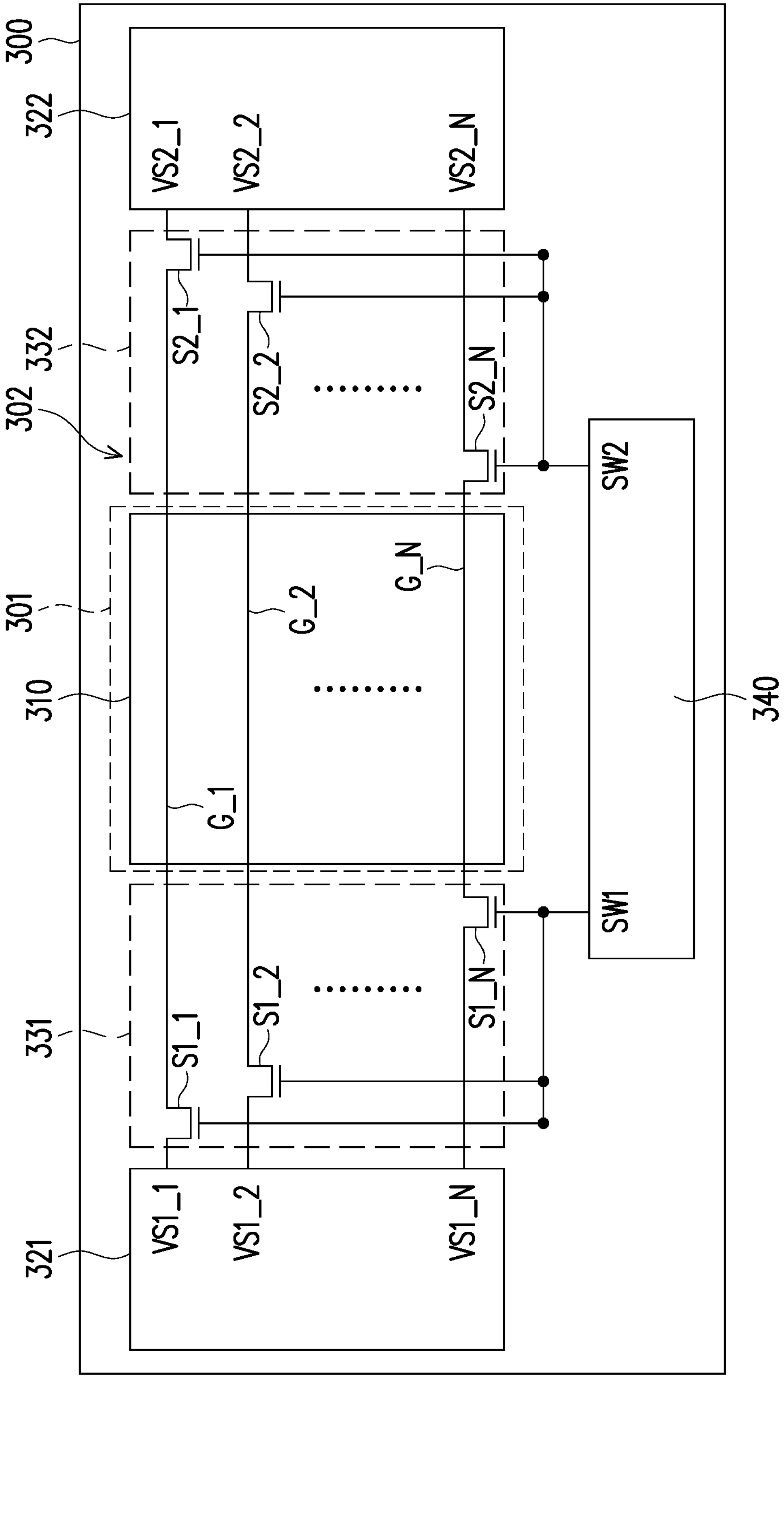
FIG. 3 is a schematic circuit diagram of a circuit driving substrate according to another embodiment of the disclosure.

FIG. 3 is a schematic circuit diagram of a circuit driving substrate according to another embodiment of the disclosure. Referring to FIG. 3, a circuit driving substrate 300 has an active area 301 and a peripheral area 302. The circuit driving substrate 300 includes a pixel array 310, a first driving circuit 321, a second driving circuit 322, a first switching circuit 331, a second switching circuit 332, and a control circuit 340. The pixel array 310 is disposed in the active area 301. The first driving circuit 321, the second driving circuit 322, the first switching circuit 331, the second switching circuit 332, and the control circuit 340 are disposed in the peripheral area 302. In this embodiment, a first switching circuit 31 is coupled to the pixel array 310 through the plurality of gate lines G_1-G_N. The second switching circuit 332 is coupled to the pixel array 310 through the gate lines G_1-G_N. The first driving circuit 321 is coupled to the first switching circuit 331. The second driving circuit 322 is coupled to the second switching circuit 332. The control circuit 340 is coupled to the first driving circuit 321 and the second driving circuit 322. The control circuit 340 may output the first switching signal SW1 and the second switching signal SW2.

In this embodiment, the first switching circuit 331 may include a plurality of first switching transistors S1_1-S1_N. The first switching transistors S1_1-S1_N are coupled between the first driving circuit 321 and the gate lines G_1-G_N. A control end of each of the first switching transistors S1_1-S1_N may be coupled to the control circuit 340 through a first circuit node (single circuit node) to receive the first switching signal SW1. First ends of the first switching transistors S1_1-S1_N may be coupled to the first driving circuit 321 to receive first voltage signals VS1_1-VS1_N, respectively. Second ends of the first switching transistors S1_1-S1_N may be respectively coupled to one ends of the gate lines G_1-G_N. The first switching transistors S1_1-S1_N may determine whether to provide the first voltage signals VS1_1-VS1_N to the gate lines G_1-G_N according to the first switching signal SW1. In this embodiment, the second switching circuit 332 may include a plurality of second switching transistors S2_1-S2_N. The second switching transistors S2_1-S2_N are coupled between the second driving circuit 322 and the gate lines G_1-G_N. A control end of each of the second switching transistors S2_1-S2_N may be coupled to the control circuit 340 through a second circuit node (single circuit node) to receive the second switching signal SW2. First ends of the second switching transistors S2_1-S2_N may be coupled to the second driving circuit 322 to receive second voltage signals VS2_1-VS2_N, respectively. Second ends of the second switching transistors S2_1-S2_N may be respectively coupled to the other ends of the gate lines G_1-G_N. The second switching transistors S2_1-S2_N may determine whether to provide the second voltage signals VS2_1-VS2_N to the gate lines G_1-G_N according to the second switching signal SW2.

In this embodiment, the first switching transistors S1_1-S1_N and the second switching transistors S2_1-S2_N may be N-type transistors, such as N-metal-oxide-semiconductor (NMOS) transistors, respectively, but the disclosure is not limited thereto. In one embodiment, the first switching transistors S1_1-S1_N and the second switching transistors S2_1-S2_N may also be P-type transistors, respectively. In this embodiment, the signal waveform of the first switching signal SW1 and the signal waveform of the second switching signal SW2 may be in opposite phases. Therefore, the first switching circuit 331 and the second switching circuit 332 may selectively provide the first voltage signal or the second voltage signal to the gate lines G_1-G_N according to the first switching signal SW1 and the second switching signal SW2. In this embodiment, the first voltage signal may have a signal waveform change of a first high voltage level and a first low voltage level, and the second voltage signal may have a signal waveform change of a second high voltage level and a second low voltage level. It should be noted that the first high voltage level is different from the second high voltage level, and/or the first low voltage level is different from the second low voltage level. In this way, since the plurality of gate line signals respectively transmitted by the gate lines G_1-G_N are determined according to the first voltage signal and the second voltage signal, the plurality of gate line signals respectively transmitted by the gate lines G_1-G_N may have at least three different voltage level changes. The plurality of pixel units in the pixel array 310 can achieve multiple display driving effects according to different voltage level changes received through the gate lines G_1-G_N.

Figure 4:
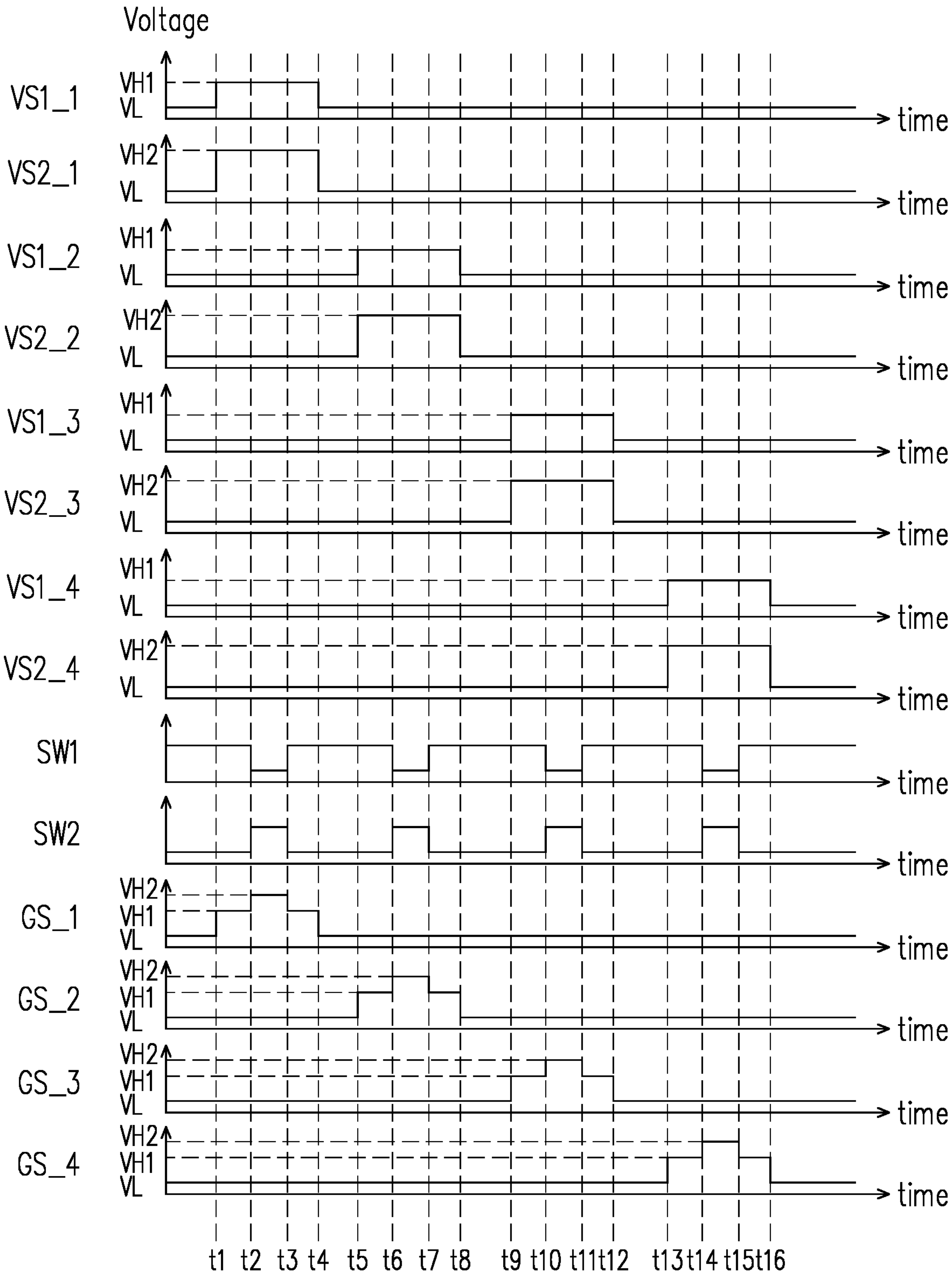
FIG. 4 is a signal timing diagram of a plurality of signals of the embodiment of FIG. 3 of the disclosure.

FIG. 4 is a signal timing diagram of a plurality of signals of the embodiment of FIG. 3 of the disclosure. Referring to FIG. 3 and FIG. 4, the following exemplary embodiments will take the driving results of the gate lines G_1-G_4 as an example, and the driving methods of the gate lines G_5-G_N may be deduced by analogy. In this embodiment, the first voltage signals VS1_1-VS1_N may have signal waveform changes of a high voltage level VH1 and a low voltage level VL, respectively. The second voltage signals VS2_1-VS2_N may have signal waveform changes of a high voltage level VH2 and the low voltage level VL, respectively. In this embodiment, the high voltage level VH1 may be, for example, 18 volts; the high voltage level VH2 may be, for example, 45 volts; and the low voltage level VL may be, for example, −30 volts.

In this embodiment, before a time t1, the first voltage signals VS1_1-VS1_4 may be at the low voltage level VL, and the second voltage signals VS2_1-VS2_4 may be at the low voltage level VL. The first switching signal SW1 is at a high voltage level to turn on (conduct) the first switching transistors S1_1-S1_4. The second switching signal SW2 is at a low voltage level to turn off (disconnect) the second switching transistors S2_1-S2_4. Therefore, gate line signals GS_1-GS_4 transmitted by the gate lines G_1-G_4 are at the low voltage level VL.

During the period from the time t1 to a time t2, the first voltage signal VS1_1 may be changed to the high voltage level VH1, and the second voltage signal VS2_1 may be changed to the high voltage level VH2. The first switching signal SW1 is at a high voltage level to turn on (conduct) the first switching transistor S1_1. The second switching signal SW2 is at a low voltage level to turn off (disconnect) the second switching transistor S2_1. Therefore, the gate line signal GS_1 transmitted by the gate line Gi may be changed to the high voltage level VH1.

During the period from the time t2 to a time t3, the first voltage signal VS1_1 is maintained at the high voltage level VH1, and the second voltage signal VS2_1 is maintained at the high voltage level VH2. The first switching signal SW1 may be changed to a low voltage level to turn off (disconnect) the first switching transistor S1_1. The second switching signal SW2 may be changed to a high voltage level to turn on (conduct) the second switching transistor S2_1. Therefore, the gate line signal GS_1 transmitted by the gate line Gi may be changed to the high voltage level VH2.

During the period from the time t3 to a time t4, the first voltage signal VS1_1 is maintained at the high voltage level VH1, and the second voltage signal VS2_1 is maintained at the high voltage level VH2. The first switching signal SW1 may be changed to a high voltage level to turn on (conduct) the first switching transistor S1_1. The second switching signal SW2 may be changed to a low voltage level to turn off (disconnect) the second switching transistor S2_1. Therefore, the gate line signal GS_1 transmitted by the gate line Gi may be changed to the high voltage level VH1.

During the period from the time t4 to a time t5, the first voltage signal VS1_1 may be changed to the low voltage level VL, and the second voltage signal VS2_1 may be changed to the low voltage level VL. The first switching signal SW1 is at a high voltage level to turn on (conduct) the first switching transistor S1_1. The second switching signal SW2 is at a low voltage level to turn off (disconnect) the second switching transistor S2_1. Therefore, the gate line signal GS_1 transmitted by the gate line Gi may be changed to the low voltage level VL.

By analogy, during the period from the time t5 to a time t8, the first voltage signal VS1_2 may be changed to the high voltage level VH1, and the second voltage signal VS2_2 may be changed to the high voltage level VH2. During the period from a time t6 to a time t7, the first switching signal SW1 may be changed to a low voltage level, and the second switching signal SW2 may be changed to a high voltage level. In this way, during the period from the time t5 to the time t8, the voltage level of the gate line signal GS_2 transmitted by the gate line G_2 may be sequentially changed to the high voltage level VH1, the high voltage level VH2, and the high voltage level VH1.

By analogy, during the period from a time t9 to a time t12, the first voltage signal VS1_3 may be changed to the high voltage level VH1, and the second voltage signal VS2_3 may be changed to the high voltage level VH2. During the period from a time t10 to a time t11, the first switching signal SW1 may be changed to a low voltage level, and the second switching signal SW2 may be changed to a high voltage level. In this way, during the period from the time t9 to the time t12, the voltage level of the gate line signal GS_3 transmitted by the gate line G_3 may be sequentially changed to the high voltage level VH1, the high voltage level VH2, and the high voltage level VH1.

By analogy, during the period from a time t13 to a time t16, the first voltage signal VS1_4 may be changed to the high voltage level VH1, and the second voltage signal VS2_4 may be changed to the high voltage level VH2. During the period from a time t14 to a time t15, the first switching signal SW1 may be changed to a low voltage level, and the second switching signal SW2 may be changed to a high voltage level. In this way, during the period from the time t13 to the time t16, the voltage level of the gate line signal GS_4 transmitted by the gate line G_4 may be sequentially changed to the high voltage level VH1, the high voltage level VH2, and the high voltage level VH1.

Therefore, the gate line signals GS_1-GS_4 transmitted by the gate lines G_1-G_4 of the present embodiment can provide signal waveforms having different multi-level voltage levels in time division, and the gate line signals transmitted by the gate lines G_5-G_N may be deduced by analogy, so that the circuit driving substrate 300 can achieve multiple and effective display driving functions.

However, it should be noted that the signal waveforms and the waveform change timings having multi-level voltage levels of the gate line signals according to the disclosure may be determined according to the changes of the first switching signal, the second switching signal, the first voltage signal, and the second voltage signal of different waveforms (or different pulse changes), and are not limited to FIG. 4. In some embodiments of the disclosure, the gate line signals transmitted by the gate line of the disclosure may also form signal waveforms having multi-level voltage levels that are sequentially changed to the low voltage level VL, the high voltage level VH1, the high voltage level VH2, and the low voltage level VL, for example; or signal waveforms having multi-level voltage levels that are sequentially changed to the low voltage level VL, the high voltage level VH2, the high voltage level VH1, and the low voltage level VL; or signal waveforms having multi-level voltage levels that are sequentially changed to the low voltage level VL, the high voltage level VH2, the high voltage level VH1, the high voltage level VH2, and the low voltage level VL.

In summary, the circuit driving substrate, the display panel, and the display driving method of the disclosure can provide voltage signals having different voltage levels to a plurality of gate lines through two driving circuits in time division, so as to generate the gate line signals with signal waveforms having multi-level voltage levels, thereby realizing effective and multiple display driving functions, effectively saving the design cost of the driving circuit, and reducing the complexity of the circuit.

Although the disclosure has been disclosed as above with examples, it is not intended to limit the disclosure. Anyone with ordinary knowledge in the technical field may make some changes and modifications without departing from the spirit and scope of the disclosure. The protection scope of the disclosure shall be determined by the scope of the appended claims.

What is claimed is:

1. A circuit driving substrate, comprising:
   - a pixel array;
   - a first switching circuit, coupled to the pixel array through a plurality of gate lines, and receiving a first switching signal;
   - a second switching circuit, coupled to the pixel array through the gate lines, and receiving a second switching signal;
   - a first driving circuit, coupled to the first switching circuit, and configured to output a first voltage signal to the first switching circuit; and
   - a second driving circuit, coupled to the second switching circuit, and configured to output a second voltage signal to the second switching circuit,
   - wherein the first switching circuit and the second switching circuit selectively provide the first voltage signal or the second voltage signal to the gate lines according to the first switching signal and the second switching signal;
   - wherein a plurality of gate line signals respectively transmitted by the gate lines are determined according to the first voltage signal and the second voltage signal, and the gate line signals have at least three different voltage level changes.

2. The circuit driving substrate according to claim 1, wherein the first voltage signal has a signal waveform change of a first high voltage level and a first low voltage level, and the second voltage signal has a signal waveform change of a second high voltage level and a second low voltage level, wherein the first high voltage level is different from the second high voltage level.

3. The circuit driving substrate according to claim 1, wherein the first switching circuit comprises a plurality of first switching transistors, and the first switching transistors are coupled between the first driving circuit and the gate lines, wherein the second switching circuit comprises a plurality of second switching transistors, and the second switching transistors are coupled between the second driving circuit and the gate lines.

4. The circuit driving substrate according to claim 3, wherein a control end of the first switching transistors respectively receives the corresponding first switching signal, and a control end of the second switching transistors respectively receives the corresponding the second switching signal.

5. The circuit driving substrate according to claim 1, wherein the first switching circuit and the first driving circuit are disposed on a first side of a peripheral area of the circuit driving substrate, and the second switching circuit and the second driving circuit are disposed on a second side of the peripheral area of the circuit driving substrate, wherein the first side is opposite to the second side.

6. The circuit driving substrate according to claim 1, wherein the first switching circuit and the first driving circuit are disposed on a first side of a peripheral area of the circuit driving substrate, and the second switching circuit and the second driving circuit are disposed a third side of the peripheral area of the circuit driving substrate, wherein the first side is adjacent to the third side.

7. The circuit driving substrate according to claim 1, wherein the first switching circuit, the second switching circuit, the first driving circuit, and the second driving circuit are disposed on a same side of a peripheral area of the circuit driving substrate.

8. A display driving method for a circuit driving substrate, the circuit driving substrate comprising a pixel array, a first switching circuit, a second switching circuit, a first driving circuit, and a second driving circuit, wherein the first switching circuit and the second switching circuit are coupled to the pixel array through a plurality of gate lines, the first driving circuit is coupled to the first switching circuit, and the second driving circuit is coupled to the second switching circuit, wherein the display driving method comprises:

outputting a first voltage signal to the first switching circuit through the first driving circuit;

outputting a second voltage signal to the second switching circuit through the second driving circuit;

receiving a first switching signal through the first switching circuit;

receiving a second switching signal through the second switching circuit; and selectively providing the first voltage signal or the second voltage signal to the gate lines through the first switching circuit and the second switching circuit according to the first switching signal and the second switching signal;

wherein a plurality of gate line signals respectively transmitted by the gate lines are determined according to the first voltage signal and the second voltage signal, and the gate line signals have at least three different voltage level changes.

9. The display driving method according to claim 8, wherein the first voltage signal has a signal waveform change of a first high voltage level and a first low voltage level, and the second voltage signal has a signal waveform change of a second high voltage level and a second low voltage level, wherein the first high voltage level is different from the second high voltage level.

10. A display panel, comprising:

a pixel array;

a first switching circuit, coupled to the pixel array through a plurality of gate lines, and receiving a first switching signal;

a second switching circuit, coupled to the pixel array through the gate lines, and receiving a second switching signal;

a first driving circuit, coupled to the first switching circuit, and configured to output a first voltage signal to the first switching circuit;

a second driving circuit, coupled to the second switching circuit, and configured to output a second voltage signal to the second switching circuit; and a display layer, located on the pixel array;

wherein the first switching circuit and the second switching circuit selectively provide the first voltage signal or the second voltage signal to the gate lines according to the first switching signal and the second switching signal;

wherein a plurality of gate line signals respectively transmitted by the gate lines are determined according to the first voltage signal and the second voltage signal, and the gate line signals have at least three different voltage level changes.

* * * * *